United States Patent [19]

Ulming

[11] Patent Number: 4,559,969
[45] Date of Patent: Dec. 24, 1985

[54] SAFETY DEVICE FOR VENTING EXCESS PRESSURE IN WET CAPACITOR CONTAINERS

[75] Inventor: Lennart E. Ulming, Röttle, Sweden

[73] Assignee: Telefonaktiebolaget LM Ericsson, Stockholm, Sweden

[21] Appl. No.: 653,608

[22] Filed: Sep. 21, 1984

[30] Foreign Application Priority Data

Oct. 12, 1983 [SE] Sweden .............................. 8305609

[51] Int. Cl.⁴ ............................................ F16K 17/04
[52] U.S. Cl. .............................. 137/540; 174/17 VA; 251/337; 361/272
[58] Field of Search ............ 137/535, 540, 539, 539.5, 137/543.17, 843, 852; 251/337; 174/17 VA; 361/272, 274

Primary Examiner—Robert G. Nilson
Attorney, Agent, or Firm—Roberts, Spiecens & Cohen

[57] ABSTRACT

A safety device for venting excess pressure in a wet capacitor container (1) includes a lift valve (4) disposed in the wall or lid of the container, the body of the valve (4) being disposed with the aid of at least one resilient member (6) for being pressed against the valve seat (7) against the action of the pressure prevailing in the container (1), the member (6) being implemented as a resilient tongue (6) on a washer-like spring (8), where the tongue has been bent over in a direction towards the valve body (5). The spring (8) is also provided with a plurality of tongues (9) bent over in a direction away from the valve body (5) for retaining the spring (8) in the container.

4 Claims, 3 Drawing Figures

SAFETY DEVICE FOR VENTING EXCESS PRESSURE IN WET CAPACITOR CONTAINERS

TECHNICAL FIELD

The present invention relates to a safety device for venting excess pressure in wet capacitor containers. The safety device includes a lift valve intended to connect the interior of the container with the surrounding atmosphere in its open position.

BACKGROUND ART

Wet capacitor packs are usually enclosed in pressure-tight containers, often in the form of cases. With regard to the fact that excess pressure can occur in the capacitor, there must be some kind of safety device which can open communication between the interior of the container and the surrounding atmosphere so that excess pressure may be vented. Up to now, such safety devices have usually consisted of a rubber plug disposed in an opening in the container, and dimensioned to yield when an excess pressure of a predetermined value occurs. Instead of a rubber plug a diaphragm has sometimes been used, which is allowed to rupture on reaching the excess pressure. Common to both these types of safety device is that the capacitor must be rejected after the excess pressure has occured, since the open communication to the surrounding atmosphere remains even after reduction in pressure.

It is also known to vent the excess pressure via a lift valve arranged in the wall or lid of the container, the lift valve containing an elastic valve body, e.g. of rubber. Due to its elasticity, the body is compressed by, and opens for the excess pressure, subsequently closing again when the excess pressure has been dissipated. Even though this type of safty device automatically vents the excess pressure without the need of service or exchange after the excess pressure has occured, it has a short life, due to ageing phenomena in the elastic valve body, particularly at high temperatures.

DISCLOSURE OF INVENTION

The object of the present invention is therefore to provide a safety device of the kind mentioned in the introduction, where the excess pressure occuring is automatically vented and where the capacitor container remains pressure-tight for a long time, even after repeated venting of the excess pressure. Another object of the invention is that the valve body of the safety device shall provide effective sealing even if the capacitor is subjected to high working temperatures.

This is achieved by the safety device in accordance with the invention having been given the characterizing features disclosed in claim 1.

Further developments of the invention are apparent from the subordinate claims.

BRIEF DESCRIPTION OF DRAWINGS

The invention will now be described in detail below with reference to the accompanying drawings, on which.

BEST MODE FOR CARRYING OUT THE INVENTION

Figure 1:
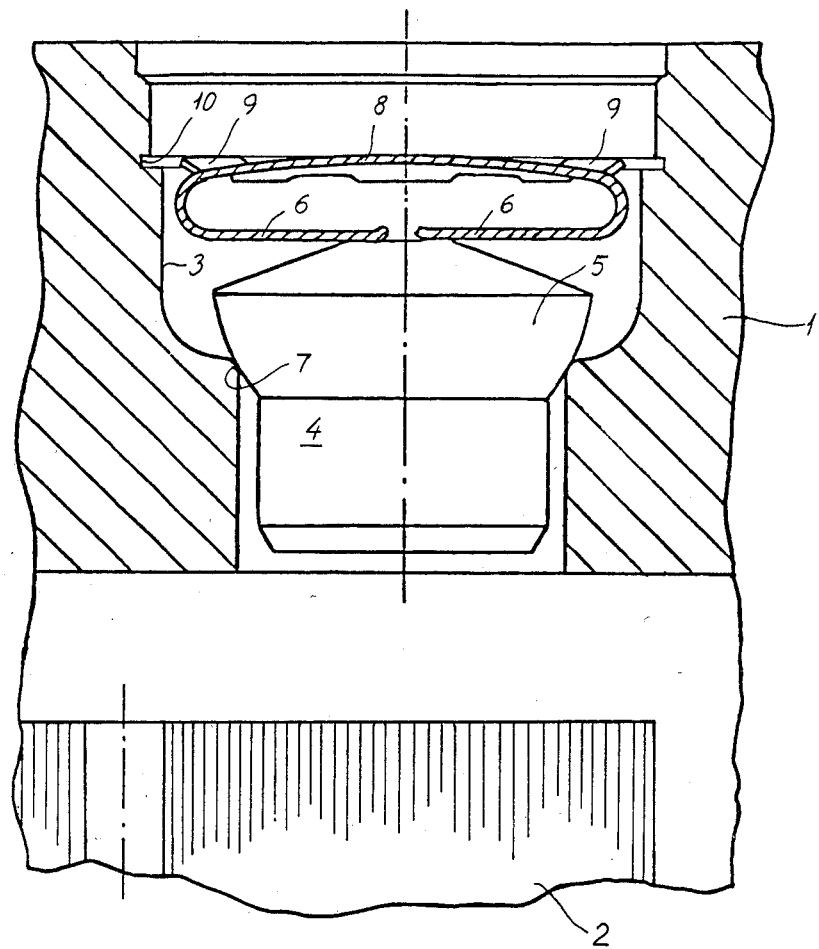
FIG. 1 is a partial section of a wet capacitor container, with a safety device in accordance with the invention disposed in its wall or lid.

FIG. 1 is a fragmentary section of a wall (or a lid) 1 of a container (e.g. a case) for schematically indicated wet capacitor pack 2. The wall 1 has a through opening 3 in which a safety device is disposed in the form of a lift valve generally denoted by the numeral 4. The valve includes a valve body 5, preferably of plastics, rubber, or the like substantially plastic or elastic material, which is urged with the aid of two resilient tongues 6 against a valve seat 7 of conventional implementation made in the opening 3. The tongues 6 are operatively united with a holding spring 8, which is adapted to limit the movement of the valve body 5 and the tongues 6.

The cylindrical surface of the valve body 5 is suitably provided with a plurality of axial guide ridges (not shown) so as not to jam against the wall and so that a more rapid flow through the valve opening will be obtained.

Figure 2:
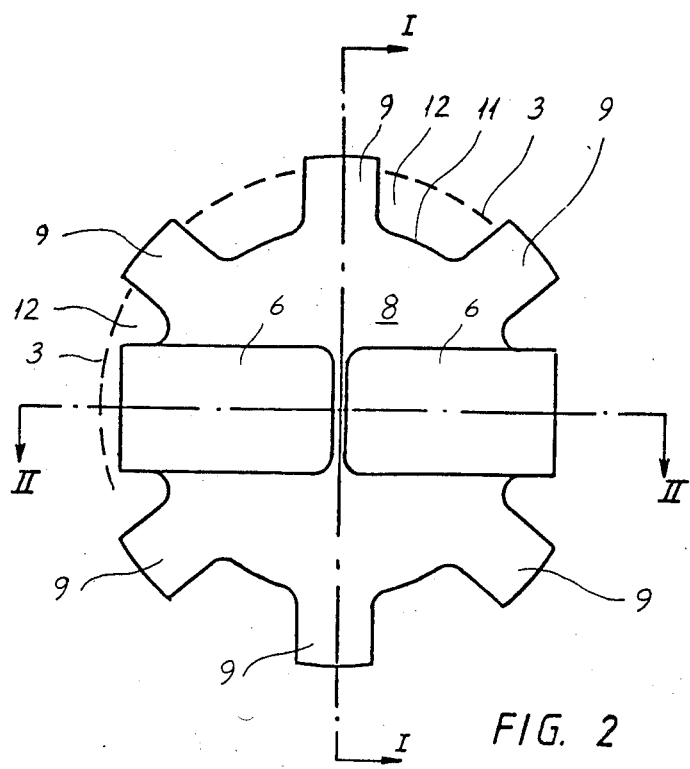
FIG. 2 is a view seen from below of a holding spring in the safety device of FIG. 1. To the left of the center line in FIG. 3 is a half-section along the line I—I in FIG. 2 and to the right thereof a half-section along the line II—II in FIG. 2.
Figure 3:
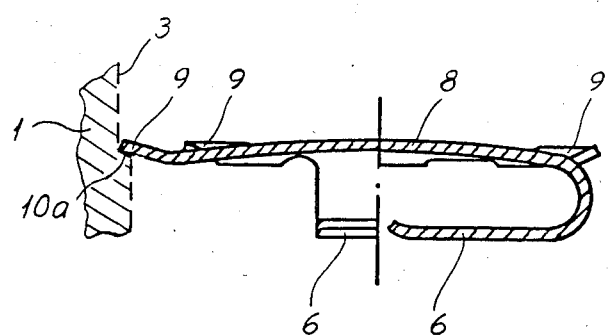

In the illustrated embodiment the holding spring 8 is circular, washer-like and made from thin sheet metal. It has, as will best be seen from FIGS. 2 and 3, two spring legs 6 bent over at about 180° in a direction towards the valve body 5, these legs constituting said resilient tongues 6, and also six resilient tongues 9 bent at about 45° in a direction away from the valve body. The free end portions of the tongues 9 can either be inserted in an annular groove 10 (see FIG. 1) made in the wall of the opening 3 or can be directly urged against a conical abutment 10a (see FIG. 3, where a partial section of the wall of the opening 3 is illustrated by a dashed line) formed in the wall of the opening 3. The holding spring 8 will thus be effectively retained in the opening 3, simultaneously as it resiliently presses the valve body 5 against the seat 7.

Since only the end portion of the tongues 9 reach into the groove 10 or come against the abutment 10a, the peripheral edge 11 of the holding spring 8 between the tongues 9 is at some distance from the wall of the opening 3. There are thus formed six peripheral openings 12 between the wall of the opening 3 (partially indicated by a dashed line in FIG. 2) and said peripheral edge 11, which allow the passage of gas.

The function of the safety device is as follows.

As long as the spring bias in the holding spring 8, i.e. primarily the tongues 6, but also the tongues 9 as well as the central portion of the holding spring 8, capable of overcoming the pressure in the container 1 the valve 4 is closed. If the predetermined excess pressure occurs in the wet capacitor, the valve 4 is opened by the pressure urging the valve body 5 outwards against the action of the holding spring 8. The excess pressure is thus vented through the opening 3 via the previously mentioned openings 12 to the surrounding atmosphere. As soon as the excess pressure has been vented the holding spring 8 urges the valve body 5 back against the valve seat 7 so that the valve closes once again.

Although the holding spring 8 and resilient tongues 6 may to advantage consist of a washer-like spring, the holding spring may also be replaced, in another unillustrated embodiment, by a spiral spring or the like, engaging against a conventional lock washer.

I claim:

1. A safety device for venting excess pressure in a wet capacitor container (1), including a lift valve (4) with a valve body (5) and a valve seat (7), said valve in an open position being intended to connect the interior of the container with the surrounding atmosphere, the valve body (5) being disposed for being pressed against the valve seat (5) with the aid of spring bias against the action of the pressure prevailing in the container (1), characterized in that the safety device includes a resilient means of sheet metal, which is formed as a washer-like holding spring (8), which by engagement with the wall at the mouth of the container (1) is retained in this wall, and also has at least one projection (6) originally extending ouside the periphery of the holding spring (8) but bent over in a direction towards the central point thereof to form a tongue resiliently engaging against the body (5).

2. Safety device as claimed in claim 1, characterized in that the holding spring (8) has a plurality of preferably resilient tongues (9) bent over in a direction away from the valve body (5) and which are anchored in the wall at the mouth of the container (1).

3. Safety device as claimed in claim 2, characterized in that the peripheral edge (11) of the holding spring (8) situated between said tongues (9) is situated at a distance from the wall of the valve opening in the container (1), whereby an excess pressure in the latter can be vented outside said peripheral edge (11).

4. Safety device as claimed in any of claims 1–3, characterized in that the valve body (5) is of mainly plastic or elastic material.

* * * * *